Patented June 6, 1939

2,160,935

UNITED STATES PATENT OFFICE 2,160,935

POLYMERIZATION OF VINYLIDENE HALIDES

Ralph M. Wiley, Midland, Mich., assignor to The Dow Chemical Company, Midland, Mich., a corporation of Michigan No Drawing. Application September 16, 1937, Serial No. 164,128

14 Claims. (Cl. 260—80)

This invention relates to the polymerization of vinylidene halides, i. e. vinylidene chloride, bromide and chloro-bromide, and particularly to an improved catalyst therefor. The present application is a continuation-in-part of my prior application, Serial Number 125,829, filed February 15, 1937.

The polymers of vinylidene halides and co-polymers thereof with other polymerizable materials are valuable substances which can be employed in the preparation of molded articles, films, filaments, and the like. The compounds, however, polymerize very slowly in the presence of light, air, and/or many of the catalysts heretofore proposed for the polymerization of other unsaturated compounds. It is necessary therefore to provide a process whereby vinylidene halides can be caused to polymerize rapidly, either alone or in the presence of a material co-polymerizable therewith, in order that the polymeric product may be obtained on a commercial basis.

Certain materials, which are herein designated as "peroxides", accelerate slightly the polymerization rate of monomeric vinylidene halides and of mixtures thereof with other polymerizable compounds. Such peroxides include ozone, organic peroxides, such as benzoyl peroxide, acetyl peroxide, acetyl benzoyl peroxide, and the like, and inorganic peroxides such as hydrogen peroxide, barium peroxide, and their reaction products with acids or anhydrides. In order to secure the accelerating effects of such agents in the polymerization of vinylidene chloride or mixtures containing the same, it is necessary to use relatively high temperatures, especially in the production of co-polymeric bodies. The use of elevated polymerizing temperatures results in products which have lower viscosities and lower tensile strength than the polymeric products obtained through the use of polymerizing temperatures nearer room temperature.

Certain organo-metallic compounds, in which there is a direct linkage between the metal and a carbon atom in the molecule, have been employed as catalysts for the polymerization of compounds containing the vinyl radical. Such organo-metallic compounds, e. g. diethyl zinc, diethyl mercury, tetra-methyl tin, tetra-ethyl lead, etc., have no particular accelerating influence on the rate of polymerization of such materials.

I have now found, however, that the combination of such organo-metallic compound with a peroxide constitutes an active catalyst for accelerating the polymerization rate of vinylidene halides and mixtures thereof with other polymerizable materials at room temperatures, and that the polymeric product obtained by the use of such composite catalyst has a particularly high tensile strength and is adapted to be employed in a variety of commercial applications.

I have also found that the addition of various halogenated organic compounds to vinylidene halides, or to their mixtures with other polymerizable materials, does not increase their rates of polymerization. For example, the addition of poly-halo oxygen-containing organic compounds, such as polychloro- or bromo-phenols, polychloro- or bromo-hydrocarbon substituted phenols, trichloro-phenoxy ethyl chloride, chloro-acetyl chloride, or poly-halo aryl ethers affects the plasticity of the final product, but has no noticeable influence on the rate of polymerization.

When, however, such poly-halo oxygen-containing organic compounds are employed together with a peroxide and an organo-metallic compound, especially an alkyl-metallic compound, the catalytic activity of the peroxide and that of the organo-metallic compound are both materially enhanced to a value which is higher than that of catalysts composed solely of a peroxide and an organo-metallic compound.

Similarly, a mixture of a poly-halo oxygen-containing organic compound of the type defined above and an organo-metallic compound, especially an alkyl-metallic compound, constitutes a more active catalyst for the polymerization of vinylidene halides and of mixtures thereof containing other polymerizable materials (such as vinyl chloride, vinyl acetate, styrene compounds, or acrylates) than do the individual components of such catalyst mixture.

The invention, then, consists in a catalyst for the polymerization of vinylidene halides, either alone or in admixture with co-polymerizable substances, such catalyst comprising agents from two or more of the groups: peroxides, organo-metallic compounds, and poly-halo oxygen-containing organic compounds.

When the catalyst consists of an organo-metallic compound and a peroxide, I may employ between about 10 and about 90 parts by weight of the former, preferably between about 20 and about 60 parts by weight thereof, for each 90 to 10 parts by weight, preferably between about 80 and about 40 parts, of the peroxide.

When the catalyst employed comprises a poly-halo oxygen-containing organic compound, an organo-metallic compound, and/or a peroxide, the preferred proportions are between about 0.5 and about 5.0 parts of the organo-metallic compound and/or an equal, or slightly greater amount of the peroxide, for each 90 to 99.5 parts of the poly-halo oxygen-containing organic compound.

The amount of such catalyst required for polymerization of a vinylidene halide is generally between about 0.01 and 2.0 per cent of the peroxide and/or organo-metallic component thereof based on the weight of vinylidene halide or polymerizable material comprising a vinylidene halide, depending upon the nature of the product desired and the temperature to be employed in the polymerization process. It is to be understood that the proportions given above are not limiting, but are merely given by way of example.

The following examples illustrate the practice of my invention:

Example 1

27.6 parts by weight of vinylidene chloride was mixed with 6.2 parts of a catalyst composed of approximately 3 per cent tetra-ethyl lead, 1 per cent benzoyl peroxide, and 96 per cent hexa-chloro-diphenyl oxide at atmospheric pressure and at about 30° C. The mixture was permitted to stand in a closed glass bottle for 92 hours, at the end of which time there was recovered 25 parts by weight of polymerized vinylidene chloride suitable for use in the preparation of molded articles, films, filaments, and the like.

The same quantity of monomeric vinylidene chloride was mixed with a like amount of benzoyl peroxide and tetra-ethyl lead, the hexa-chloro-diphenyl oxide being omitted. This mixture was subjected to the same conditions as was the first mixture. At the end of the reaction period, however, there was produced 12.5 grams of a polymer. When hexachloro-diphenyl oxide was employed, the rate of polymer formation was nearly 1 per cent per hour, based on the weight of the reaction mixture. In the absence of hexa-chloro-diphenyl oxide, the polymerization rate was approximately 0.5 per cent per hour.

Example 2

27.6 parts by weight of vinylidene chloride was mixed with 5.4 parts of a catalyst composed of approximately 1.1 per cent benzoyl peroxide, 2.9 per cent tetra-ethyl lead and 96 per cent dichloro-diphenyl oxide. This mixture was subjected to the same conditions as were employed in Example 1. At the end of the reaction period there was obtained 23 grams of a commercially satisfactory product. This corresponds to a reaction rate of nearly 1 per cent per hour based on the weight of the mixture.

Example 3

To 32 grams of a mixture consisting of 4 per cent by volume of monomeric styrene and 96 per cent of vinylidene chloride, which had been kept in monomeric form in the presence of one-half per cent by weight of phenol as a stabilizing agent, was added 1.5 per cent by weight of a mixture of equal parts of benzoyl peroxide, tetra-ethyl lead, and chloro-acetyl chloride. The mixture was co-polymerized by holding at 50° C. for approximately 48 hours. 29.5 grams of a white, chalky, co-polymer was obtained. This material softened and became plastic when heated to 193° C., and after cooling to room temperature formed a very tough, amber colored resin.

Example 4

The following table sets forth the experimental results obtained in a series of studies of the catalytic activity of a number of single and mixed catalysts on vinylidene chloride alone and on mixtures thereof with other polymerizable materials. Polymerizable was not carried to completion, but only far enough to give an index of the activity of the catalyst. In each instance 100 grams of the polymerizable material was employed and the amount of catalyst was 0.5 gram of each component of the catalyst mixture, except that in the case of hexachloro-diphenyl oxide, 30 grams was used. Polymerization was carried out at 30° C. and the yield of polymeric product is indicated in grams. For sake of convenience, the following abbreviations will be employed in the table: $BzO_2$=benzoyl peroxide, $BpEt_4$=tetra-ethyl lead, $HgEt_2$=diethyl mercury, $ZnEt_2$=diethyl zinc, $DPOCl_6$=hexachloro-diphenyl oxide.

| Monomeric material | Catalyst | Yield of polymer | Time, hours |
|---|---|---|---|
| Vinylidene chloride | None | 0.05 | 24 |
| Do | $BzO_2$ | 0.5 | 24 |
| Do | $PbEt_4$ | 0.5 | 24 |
| Do | $DPOCl_6$ | 0.1 | 24 |
| Do | $BzO_2+DPOCl_6$ | 15.0 | 24 |
| Do | $PbEt_4+BzO_2$ | 40.0 | 24 |
| Do | $PbEt_4+DPOCl_6$ | 42.0 | 24 |
| Do | $PbEt_4+BzO_2+DPOCl_6$ | 45.5 | 24 |
| Do | $HgEt_2$ | 0.4 | 24 |
| Do | $HgEt_2+BzO_2$ | 2.7 | 24 |
| Do | $ZnEt_2$ | 2.0 | 24 |
| Do | $ZnEt_2+BzO_2$ | 8.0 | 24 |
| Vinylidene chloride 73, vinyl chloride 27 | $BzO_2$ | 0.5 | 40 |
| Do | $PbEt_4+BzO_2$ | 9.0 | 40 |
| Vinylidene chloride 73, vinyl acetate 27 | $PbEt_4+BzO_2$ | 10.5 | 40 |
| Vinylidene chloride 92, styrene 8 | $BzO_2$ | 0.0 | 180 |
| Do | $BzO_2+PbEt_4$ | 15.5 | 180 |
| Vinylidene chlorobromide 75, methyl methacrylate 25 | $BzO_2$ | 0.01 | 40 |
| Do | $PbEt_4+BzO_2$ | 10.0 | 40 |

In each of the experimental runs recorded in the foregoing table, a noticeable advantage is derived from employing a catalyst consisting of a peroxide, an organo-metallic compound, and/or a poly-halo oxygen-containing organic compound. Since the conditions employed in each run are similar, and since the vinylidene chloride employed in all of the runs was from the same batch, the advantages of the new composite catalysts become apparent.

Other poly-halo oxygen-containing compounds which may be employed in a manner similar to that set forth in the examples include tribromo-phenol, tetrachloro-phenol, dichloro-cresol, trichloro-xylenol, dibromo-cyclohexyl phenol, dichloro-tertiary-butyl phenol, dichloro-phenyl phenol, dibromo-phenyl phenol, trichloro-phenoxy ethyl chloride, tribromo-phenyl ether, dichloro-diphenylene oxide, etc.

The invention has been illustrated principally with reference to vinylidene chloride and co-polymerizable mixtures of the same. The new catalyst mixtures herein described are equally effective in the polymerization of other vinylidene halides, e. g. vinylidene bromide and vinylidene bromochloride. When either of these latter materials are subjected to polymerization, and when the catalyst employed is one comprising a poly-halo oxygen-containing organic compound, the halogen may be bromine or the catalyst employed may contain a poly-bromo compound and a poly-chloro compound. This is not essential, however, as the chlorine-containing constituents of the catalyst mixture as employed in the examples are very effective in the polymerization of vinylidene halides other than the chloride.

The organo-metallic compounds which I prefer to employ are the alkyl-metallic compounds. Certain of the metal-alkyls are quite unstable in the presence of air, and to be satisfactorily employed in the new catalyst mixtures, the mixture should be prepared in the absence of air, e. g. in an inert atmosphere, such as nitrogen. After the catalyst has been prepared under conditions in which the metal-alkyl is stable, it may be mixed with the vinylidene halide to be polymerized, and can be employed at polymerization temperatures up to 50° C. or higher, if desired. Tetraethyl lead appears to be the most stable metal-alkyl compound for employment in the mixed catalysts of the type described.

Another advantage of using the improved catalysts is the fact that they can be employed to accelerate the polymerization of vinylidene halides containing a stabilizing agent without first removing such agent. When it is desired to store monomeric vinylidene halides for long periods of time, various agents, e. g. phenol, are added to prevent the polymerization thereof. The present catalyst mixtures are sufficiently active as polymerization catalysts to overcome the effect of such stabilizing agents.

It is to be understood that the new catalysts need not be mixed prior to being added to the vinylidene halide to be polymerized, but that they may individually be added thereto, and that this procedure gives as satisfactory results as when composite catalysts are prepared and then added to the polymerizable material.

Other modes of applying the principle of my invention may be employed instead of those explained, change being made as regards the materials herein disclosed, provided the ingredients stated by any of the following claims or the equivalent of such stated ingredients be employed.

I therefore particularly point out and distinctly claim as my invention:

1. A catalyst for the polymerization of a vinylidene halide which comprises a peroxide and a metal-alkyl compound.

2. A catalyst for the polymerization of a vinylidene halide which comprises a metal-alkyl compound and a poly-halo oxygen-containing organic compound selected from the group consisting of poly-halo phenols, poly-halo hydrocarbon substituted phenols, chloro-acetyl chloride, and poly-halo aryl ethers.

3. A catalyst for the polymerization of a vinylidene halide which comprises an agent selected from at least two of the groups: (a) metal-alkyl compounds, (b) peroxides, and (c) poly-halo oxygen-containing organic compounds selected from the group consisting of poly-halo phenols, poly-halo hydrocarbon substituted phenols, chloro-acetyl chloride, and poly-halo aryl ethers.

4. A catalyst for the polymerization of a vinylidene halide which comprises tetra-ethyl lead and a poly-chloro-diphenyl oxide.

5. A catalyst for the polymerization of vinylidene halides which comprises tetra-ethyl lead, benzoyl peroxide, and hexachloro-diphenyl oxide.

6. A catalyst for the polymerization of a vinylidene halide which comprises the indicated amount of an agent selected from at least two of the groups: (a) peroxides,—between about 0.5 and about 5.0 parts by weight; (b) metal-alkyl compounds,—between about 0.5 and about 5.0 parts by weight; and (c) poly-halo oxygen-containing organic compounds selected from the group consisting of poly-halo phenols, poly-halo hydrocarbon substituted phenols, chloro-acetyl chloride, and poly-halo aryl ethers,—between about 90 and about 99.5 parts by weight.

7. A catalyst for the polymerization of vinylidene halides, and mixtures thereof with polymerizable vinyl compounds, which comprises between about 10 and about 90 parts by weight of a peroxide and between about 90 and about 10 parts by weight of a metal-alkyl compound.

8. In a process for the polymerization of vinylidene halides, and mixtures thereof with polymerizable vinyl compounds, the step which consists in adding thereto a catalyst which comprises a peroxide and a metal-alkyl compound.

9. In a process for the polymerization of vinylidene halides, and mixtures thereof with polymerizable vinyl compounds, the step which consists in adding thereto a catalyst which comprises a metal-alkyl compound and a poly-halo oxygen-containing organic compound selected from the group consisting of poly-halo phenols, poly-halo hydrocarbon substituted phenols, chloro-acetyl chloride, and poly-halo aryl ethers.

10. In a process for the polymerization of vinylidene halides, and mixtures thereof with polymerizable vinyl compounds, the step which consists in adding thereto a catalyst which comprises an agent selected from at least two of the groups: (a) metal-alkyl compounds, (b) peroxides, and, (c) poly-halo oxygen-containing organic compounds selected from the group consisting of poly-halo phenols, poly-halo hydrocarbon substituted phenols, chloro-acetyl chloride, and poly-halo aryl ethers.

11. In a process for the polymerization of vinylidene halides, and mixtures thereof with polymerizable vinyl compounds, the step which consists in adding thereto a catalyst comprising between about 0.5 and about 5.0 parts of a metal-alkyl compound, and between about 0.5 and about 5.0 parts of a peroxide for each 90 to 99 parts of a poly-halo oxygen-containing organic compound selected from the group consisting of poly-halo phenols, poly-halo hydrocarbon substituted phenols, chloro-acetyl chloride, and poly-halo aryl ethers, said catalyst being employed in such proportion that the metal-alkyl compound therein corresponds to between about 0.01 and about 2.0 per cent of the weight of the polymerizable material present.

12. In a process for the polymerization of vinylidene halides, and mixtures thereof with polymerizable vinyl compounds, the step which consists in adding thereto a catalyst comprising between about 10 and about 90 parts of a metal-alkyl compound for each 90 to 10 parts by weight of a peroxide, said catalyst being employed in such an amount that the metal-alkyl compound therein corresponds to between about 0.01 and about 2.0 per cent of the weight of the polymerizable material present.

13. In a process for the polymerization of a vinylidene halide, the step which consists in adding thereto a catalyst which comprises tetra-ethyl lead and a poly-chloro-diphenyl-oxide.

14. In a process for the polymerization of a vinylidene halide, the step which consists in adding thereto a catalyst which comprises tetraethyl lead, benzoyl peroxide, and hexachloro-diphenyl-oxide.

RALPH M. WILEY.